W. WILSON.
GEOGRAPHICAL MAP, GLOBE, AND OTHER GEOGRAPHICAL APPLIANCE.
APPLICATION FILED JULY 28, 1909.

944,248.

Patented Dec. 21, 1909.

UNITED STATES PATENT OFFICE.

WILLIAM WILSON, OF EDINBURGH, SCOTLAND.

GEOGRAPHICAL MAP, GLOBE, AND OTHER GEOGRAPHICAL APPLIANCE.

944,248.  Specification of Letters Patent.  Patented Dec. 21, 1909.

Application filed July 28, 1909. Serial No. 510,131.

*To all whom it may concern:*

Be it known that I, WILLIAM WILSON, a citizen of the United Kingdom of Great Britain and Ireland, and resident at 14 Eyre Place, Edinburgh, Scotland, printer, have invented new and useful Improvements in and Relating to Geographical Maps, of which the following is a specification.

This invention relates to improvements in geographical maps, and has for its object to provide a map whereby a correct and undistorted view of the globe's surface may be obtained.

A further object thereof is to provide a map which may be used as a flat map or which, if desired, may be so arranged that it assumes a substantially globular shape.

Figure 1:
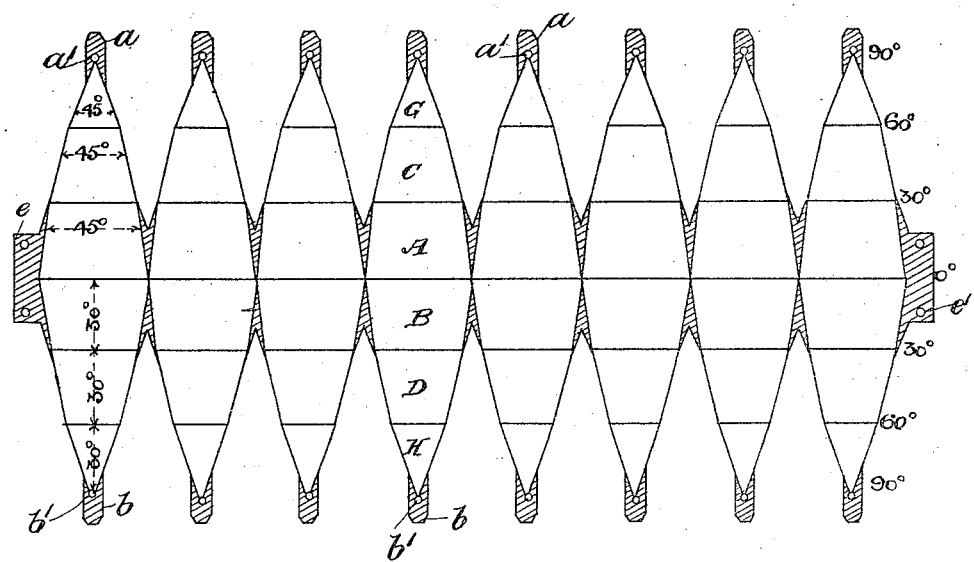
Figure 2:
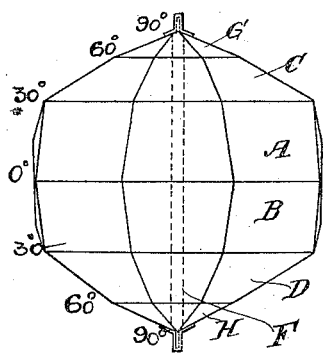
Figure 3:
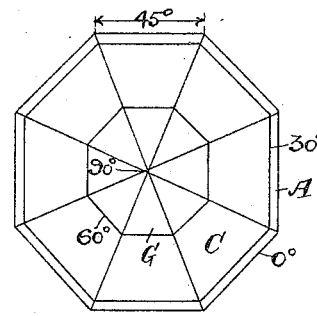
Figure 4:
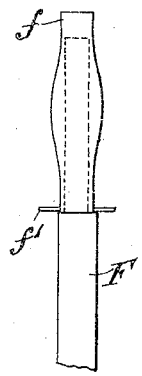

Further objects and advantages will be apparent from the following description with reference to the accompanying drawings, wherein, Figure 1 is a diagrammatical view of the preferred form of my invention, Fig. 2 is a view in elevation of my invention when used as a globe, Fig. 3 is a plan view of Fig. 2, Fig. 4 is a detail view of the means for securing the extreme ends of the map together thereby forming the map into a substantially globular figure.

In the preferred form of my invention which I have illustrated in the accompanying drawing, I propose to divide the globe into belts, running parallel to the equator, and then divide these belts into sections. As an example, I make a division of the globe into four belts and two caps obtained by dividing the globe at the latitude of the equator or 0°, at 30° latitude north and south, and at 60° latitude north and south; thus dividing the globe into north and south tropical belts A and B, north and south temperate belts C and D, and north and south polar caps G and H. These belts and caps are then divided into sections by following any given meridian lines from pole to pole cutting through the belts and caps and dividing them into sections.

In the example taken, see Figs. 1, 2 and 3, groups of 45° of longitude have been taken dividing each belt and cap into eight sections, each of the said sections being of the same dimensions and embracing an area of the earth's surface of 45° longitude and 30° of latitude. To represent these sections of the globe on a flat surface, the following projection is used. All lines representing degrees whether of latitude or longitude are straight or right lines, no curved lines being used. All lines of latitude are parallel lines see Figs. 1 and 2. The top and bottom lines of latitude and the central meridian line are first laid down, all three being on the same scale of measurement. The central meridian, or line of longitude, is perpendicular to the lines of latitude and bisects them, and may or may not be represented in the finished production as desired. Straight lines are then drawn representing the desired meridians or lines of longitude and connecting the top and bottom lines of latitude at the proper points. The desired lines of latitude are then drawn cutting the central meridian at the proper point, and extending to the outside or marginal line of longitude of the section.

The projections for all areas except those adjoining the pole are designed on the same plan. For the polar caps the projection is designed by the limiting line of latitude and a point representing the pole; these being connected in the same way as before by a central meridian indicated or not and on the same scale of measurement as the line of latitude and connecting it with the polar point. The desired meridians are then filled in, proceeding from their place on the line of latitude and all terminating at the polar point, the other lines of latitude are filled in as before. The projections being thus given it only remains to fill in the map of the area desired.

To give a representation of the whole earth on one flat map, see Fig. 1, the divisions of the globe as already made are used and arranged with the equator as a center line forming a series of eight strips such as E Fig. 1 extending from pole to pole. If desired, the polar areas can be grouped together after the manner as shown in the plan view, Fig. 3. The said divisions give an equal scale for all parts so that any area can be compared directly with any other with practical accuracy.

The sections forming the map of the world and so arranged, see Fig. 2, that the outer surface thereof is substantially polyhedrical, have tabs $a$ and $b$ Fig. 1, secured at each end viz:—north and south, said tabs being provided with the openings $a^1$ and $b^1$.

For special purposes maps of sections of the world drawn on the projections described may be made up in the form of a polyhedron and such a polyhedron may be divided into any number of portions to represent the hemispheres (or portions thereof) and being so arranged that they can be mounted and hung on a wall, showing the whole earth at one view on the same scale as the individual maps in the atlas. For the scholars individually a flat map (on the lines of Fig. 1) of the world as already described and on a convenient small scale may be used. This is so mounted that the two ends of the equator can be joined by flaps such as $e$, $e^1$ Fig. 1 and a clip, thus forming a cylinder. The vacant spaces between the divisions are also cut away or folded back and a hole punched in each strip where the poles are represented, as hereinbefore described. The spindle, a portion of which is shown in Fig. 4 may have a shoulder on each end on which the divisions are threaded, a socket such as $f$ fitting over each end of the said spindle F and keeping the tabs $a$ and $b$ on the spindle; the sockets of the spindle being preferably provided with the lugs $f^1$ to insure the tabs being kept down. The map can thus be made up as a globe Fig. 2 or opened out and used as a flat map at the convenience of the pupil—forming a perfect mental bridge between the usual round globe and the flat map.

In the example, the areas of which each belt is composed are similar in form and dimension, and stand in the simplest possible relation to each other. In the said example the areas are 45° by 30° and the belts are octagonal in plan as shown in Fig. 3. A single area therefore can be used as a unit of measure for the two belts (of which it is a part) so that any two points being taken on the earth's surface and the meridian and latitude being given, a very simple calculation will enable the pupil to find these points on the convertible map and by making it up in the globe form, specified, the relation of the two points can be conveniently ascertained.

Having thus described my invention, what I claim as new therein and desire to secure by Letters Patent, is:—

A geographical map comprising a plurality of sections tapering in opposite directions and secured together at points intermediate the two ends thereof, and a tab fastened to the opposite ends of each section, and provided with an aperture.

WILLIAM WILSON.

Witnesses:
 JOSEPH WILLIAM THOMPSON,
 JOHN FRASER.